(12) United States Patent
Shanfield (10) Patent No.: US 9,722,830 B1
(45) Date of Patent: Aug. 1, 2017

(54) DETECTION OF LOW LEVEL COMMUNICATION SIGNALS IN HIGH LEVEL NOISE

(71) Applicant: The Charles Stark Draper Laboratory, Inc., Cambridge, MA (US)

(72) Inventor: Stanley Shanfield, Newton, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 0 days.

(21) Appl. No.: 14/950,703

(22) Filed: Nov. 24, 2015

Related U.S. Application Data

(60) Provisional application No. 62/083,554, filed on Nov. 24, 2014.

(51) Int. Cl.
*H04L 27/06* (2006.01)
*H04B 1/10* (2006.01)

(52) U.S. Cl.
CPC ......... *H04L 27/066* (2013.01); *H04B 1/1081* (2013.01)

(58) Field of Classification Search
CPC .............................. H04L 27/066; H04B 1/1081
See application file for complete search history.

(56) References Cited

U.S. PATENT DOCUMENTS

| 5,694,423 | A  | * | 12/1997 | Larsson | H03H 21/0012 375/231 |
| 9,350,587 | B1 | * | 5/2016 | Fang | H04L 27/2655 |
| 2004/0223554 | A1 | * | 11/2004 | Cha | H04L 27/2675 375/260 |
| 2007/0104297 | A1 | * | 5/2007 | Gorday | H04B 1/707 375/343 |
| 2008/0107200 | A1 | * | 5/2008 | Zhu | H04L 27/2684 375/260 |
| 2009/0168745 | A1 | * | 7/2009 | Ahmadi | H04L 27/2613 370/350 |
| 2012/0026994 | A1 | * | 2/2012 | Agarwal | H04L 27/2647 370/338 |
| 2014/0226764 | A1 | * | 8/2014 | Chen | H04B 1/1081 375/341 |

* cited by examiner

*Primary Examiner* — Kenneth Lam
(74) *Attorney, Agent, or Firm* — Christopher J. McKenna; Foley & Lardner LLP (57) ABSTRACT

The disclosure is directed to a signal detection system. The system includes a receiver configured to receive data comprising noise and a signal having an amplitude lower than that of the noise received by the receiver. The system also includes a detection module configured to receive the data received by the receiver, define a region of interest of the data, compare a plurality of portions of the region of interest, and identify a portion of the region of interest that is more likely to contain the signal.

9 Claims, 10 Drawing Sheets

DETECTION OF LOW LEVEL COMMUNICATION SIGNALS IN HIGH LEVEL NOISE

RELATED APPLICATIONS

This application claims priority to U.S. Provisional Patent Application No. 62/083,554 filed on Nov. 24, 2014 and titled "DETECTION OF LOW LEVEL COMMUNICATION SIGNALS IN HIGH LEVEL NOISE," which is herein incorporated by reference in its entirety.

FIELD OF THE INVENTION

The present disclosure relates generally to signal detection, and, more particularly, to detection of low level signals embedded within high level noise.

BACKGROUND

Detection of signals by a fixed interval matched filter approach or other conventional methods requires time-consuming and resource-demanding processing. In addition, the conventional fixed interval matched filter approach is vulnerable to false detection when noise is not stationary over a given search time. Other filtering techniques may be unable to detect a relatively low amplitude signal buried in noise having a much higher amplitude, or may be unable to correctly identify the time of arrival of a detected signal.

SUMMARY

One aspect of the disclosure is directed to a signal detection system. The system includes a receiver configured to collect data including noise and a signal in the very low frequency range having an amplitude lower than that of the noise. The system includes a preamble detection module. The preamble detection module is configured to receive the data collected by the receiver, define a region of interest of the data collected by the receiver, and compare convolutions of left and right sides of the region of interest. The preamble detection module also is configured to identify a side of the region of interest that is more likely to contain the preamble, based on the comparison of the convolutions of the left and right sides of the region of interest.

In some implementations, the preamble detection module is further configured to define a plurality of portions within the side of the region of interest that is identified as more likely to contain the preamble, and iteratively compare two halves of each of the plurality of portions of the region of interest to identify a portion of the region of interest that is more likely to contain the preamble.

In some implementations, an amplitude of the noise can be at least about 50 times larger than an amplitude of the signal. In some implementations, the receiver can be configured to collect the data during a collection interval. A duration of the preamble can be less than about 2% of a duration of the collection interval. In some implementations, the preamble can be represented as at least a portion of a full square wave cycle. In some implementations, the preamble detection module can be further configured to determine an approximate time of arrival of the preamble.

In some implementations, the system can include a message extraction module configured to extract the message from the collected data. The message extraction module can include a multistage adaptive filter, and the message can be represented by a discrete function defined by a set of parameters. In some implementations, each stage of the multistage adaptive filter can be configured to receive, at a first input, reference data. The multistage adaptive filter can be configured to receive, at a second input, the data collected by the receiver. The multistage adaptive filter can be configured to generate a value for each parameter of the set of parameters. The values of the parameters can be selected to correspond to an output function representing a difference between the data received at the second input and the reference data received at the first input. multistage adaptive filter can be configured to provide, at an output, the output function.

In some implementations, the multistage adaptive filter can include a first stage and a second stage. The reference data received at the first input of the first stage can include a postulated signal input approximating the signal included within the data collected by the receiver. The reference data received at the first input of the second stage can include the output function provided at the output of the first stage. In some implementations, the postulated signal input is generated based at least in part on the output function provided at the output of the second stage.

Another aspect of the disclosure is directed to a method of detecting signals. The method includes collecting, by a receiver, data including noise and a signal in the very low frequency range having an amplitude lower than that of the noise. The signal can include a preamble and a message. The method includes defining a region of interest of the collected data. The method includes comparing convolutions of left and right sides of the region of interest. The method includes identifying a side of the region of interest that is more likely to contain the preamble, based on the comparison of the convolutions of the left and right sides of the region of interest.

In some implementations, the method can include defining a plurality of portions within the side of the region of interest that is identified as more likely to contain the preamble, and iteratively comparing two halves of each of the plurality of portions of the region of interest to identify a portion of the region of interest that is more likely to contain the preamble. In some implementations, an amplitude of the noise can be at least about 50 times larger than an amplitude of the signal. In some implementations, collecting the data can include collecting the data during a collection interval. A duration of the preamble can be less than about 2% of a duration of the collection interval. In some implementations, the preamble can be represented as at least a portion of a full square wave cycle. In some implementations, the method can include determining an approximate time of arrival of the preamble.

In some implementations, the method can include extracting the message from the collected data using a multistage adaptive filter. The message can be represented by a discrete function defined by a set of parameters. In some implementations, extracting the message from the collected data using a multistage adaptive filter can include receiving, at a first input of each stage, reference data. Extracting the message also can include receiving, at a second input of each stage, the data collected by the receiver. Extracting the message also can include generating, by each stage, a value for each parameter of the set of parameters. The values of the parameters can be selected to correspond to an output function representing a difference between the data received at the second input and the reference data received at the first input. Extracting the message also can include providing, at an output of each stage, the output function.

In some implementations, the reference data received at the first input of a first stage of the multistage adaptive filter can include a postulated signal input approximating the signal included within the data collected by the receiver. The reference data received at the first input of a second stage of the multistage adaptive filter can include the output function provided at the output of the first stage. In some implementations, the method can include generating the postulated signal input based at least in part on the output function provided at the output of the second stage.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are descriptions of various concepts related to, and implementations of, methods, apparatuses, and systems for efficiently detecting the presence of a short duration signal buried in noise having a much longer duration and much higher amplitude than the buried signal. The various concepts introduced above and discussed in greater detail below may be implemented in any of numerous ways, as the described concepts are not limited to any particular manner of implementation. Examples of specific implementations and applications are provided primarily for illustrative purposes.

Figure 1A:
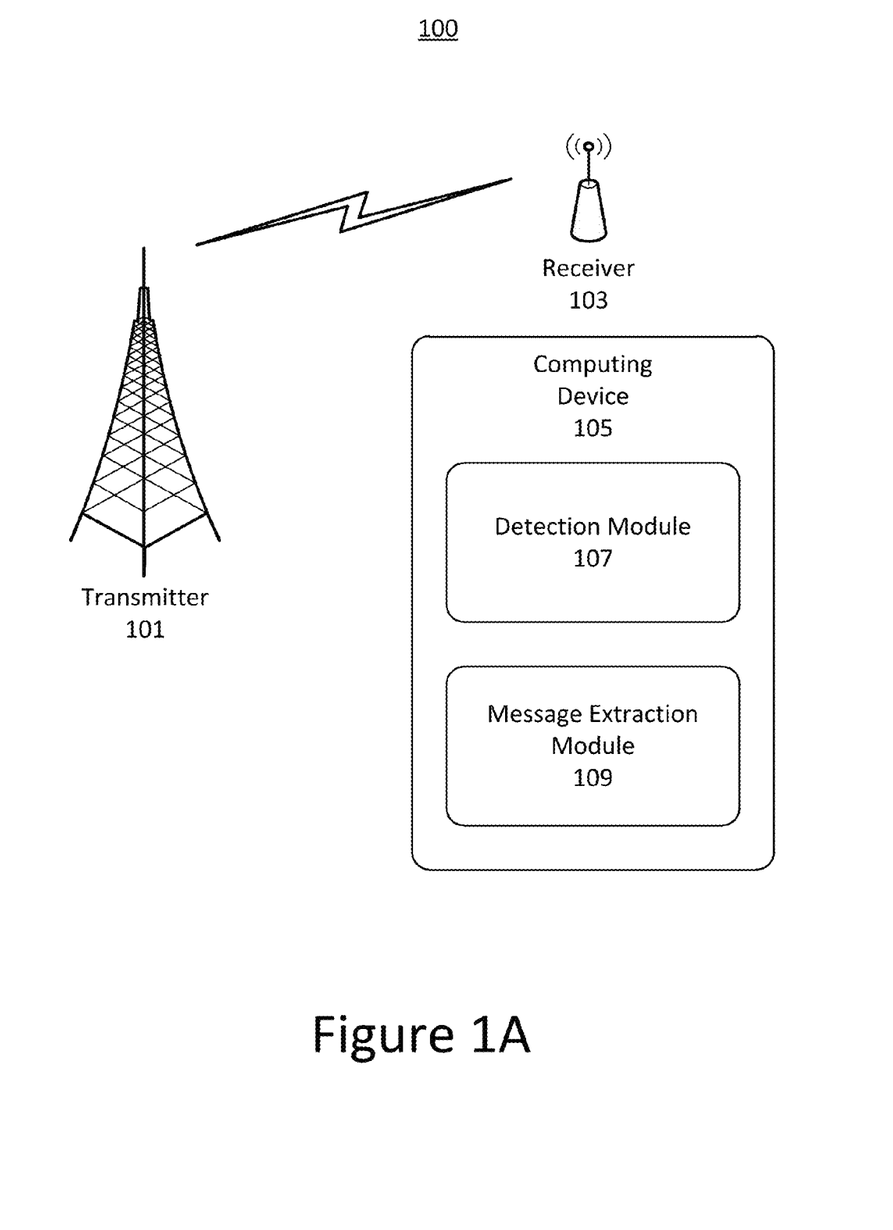
FIG. 1A is a schematic diagram of an example system for detecting signals, according to an illustrative implementation.

FIG. 1A is a schematic diagram of an example system 100 for detecting signals. The system 100 includes a transmitter 101, a receiver 103, and computing device 105. The computing device 105 can include a memory and a processor. A detection module 107 and a message extraction module 109 are also included in the system 100. It should be understood that, while FIG. 1A depicts the detection module 107 and the message extraction module 109 as components of the computing device 105, in some implementations of the system 100, the detection module 107 and the message extraction module 109 may be implemented separately from the computing device 105.

In some implementations, the transmitter 101 can be any type of transmitter capable of transmitting an electromagnetic frequency signal to a receiver 103. In some implementations, the transmitter transmits at a radio frequency in the range of 3 kHz to 30 kHz, or very low frequency (VLF). In other implementations the transmitter 101 can transmit signals at higher frequencies. In still other implementations, the transmitter 101 can be configured to transmit other types of signals, such as acoustic signals.

The receiver 103 can be incorporated in or associated with the computing device 105, the detection module 107, an antenna, and other components. in some implementations, the receiver 103 can be tuned to a specific range of frequencies. In some other implementations, the receiver 103 can be a tunable receiver, and a user can select a range of frequencies to which the receiver 103 should respond. The receiver 103 receives signals transmitted by the transmitter 101 as well as ambient or atmospheric noise that may result from other transmissions, thermal noise, wind, cosmic radiation, thunderstorms, lightning, static electricity, or other sources.

The transmitter 101 is configured to transmit a signal containing a message intended for the receiver 103. The message can be preceded by a preamble that is used by the detection module 107 to process the message. The signal is composed of oscillations that can have amplitudes less than the amplitudes of noise components that are also received by the receiver 103. The preamble can denote a temporal frame of reference for processing of the message by the detection module 107. For example, using a known spacing between the preamble and the message, the detection module 107 associated with the receiver 103 can determine the time at which the message is received, and the message extraction module 109 can use this time of arrival information to process the message amongst the noise received by the receiver 103.

The detection module 107 can be implemented as a combination of hardware and software. For example, the detection module 107 can be implemented as computer readable instructions stored on a tangible computer readable medium. When the computer executable instructions are executed, the instructions can cause the processor to carry out the functionality of the detection module 107. In some implementations, the computer executable instructions can be executed by a field programmable gate array (FPGA), an application-specific integrated circuit (ASIC), or a general purpose processor. The detection module 107 is configured to process signals received by the receiver 103. More particularly, the detection module 107 is configured to locate the preamble included in the signal and detect the message that follows. The message can then be processed by the message extraction module 107. The process by which the preamble is identified is described further below and in reference to FIGS. 4 and 5. The process by the which the message is extracted is described further below in connection with FIG. 1B and FIG. 8.

Figure 1B:
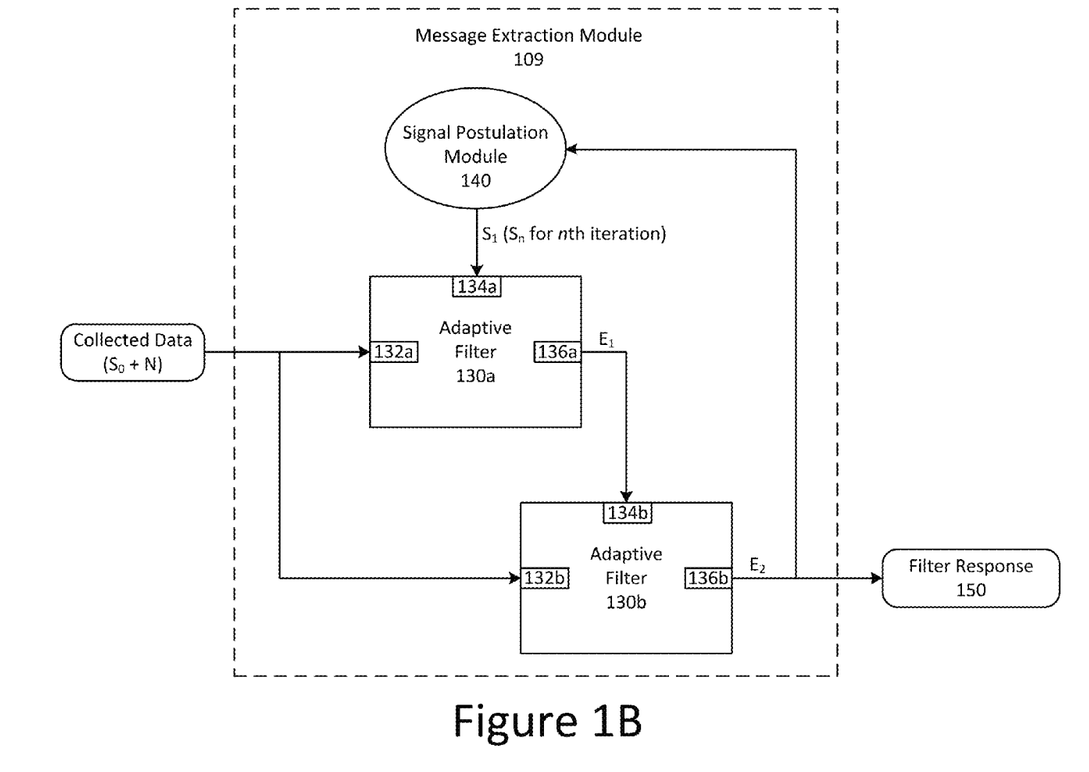
FIG. 1B is a block diagram of an example message extraction module included in the system shown in FIG. 1A.

FIG. 1B is a block diagram of an example message extraction module 109 included in the system 100 shown in FIG. 1A. The message extraction module 109 is implemented as a multistage adaptive filter which receives collected data from the receiver 103, processes the collected data to detect a message, and outputs a filter response 150. The message extraction module 109 includes a first adaptive filter 130a and a second adaptive filter 130b (generally referred to as adaptive filters 130). The first adaptive filter 130a includes a collected data input 132a, a reference data input 134a, and an output 136a. Similarly, the second adaptive filter 130b includes a collected data input 132b, a reference data input 134b, and an output 136b. A signal postulation module 140 is coupled to the reference data input 134a of the first adaptive filter 130a and to the output 136b of the second adaptive filter 130b to create a feedback loop.

The collected data shown on the left hand side of FIG. 1B can be a digital representation of the data received by the receiver 103, which includes a signal component and a noise component. In some implementations, the signal component of the collected data can represent a message received by the receiver 103. Each of the adaptive filters 130 can be configured to process the data received at the respective collected data input 132 and reference data input 134 to generate an output signal representing a difference between the collected data and the reference data. The feedback loop allows the algorithm performed by the message extraction module 109 to be iterated until the filter response 150 converges. The detailed operation of the adaptive filters 130 is discussed further below in connection with FIG. 8.

Because the message signal may be of relatively short duration, a high sampling rate may be desirable to facilitate rapid convergence of the filter response 150. For example, in some implementations, the computing device 105 may include an A/D converter configured to sample the data collected by the receiver 103 at a rate of 50 MHz, 60 MHz, 70 MHz, 80 MHz, 90 MHz or 100 MHz. In some implementations, the sampling rate may be higher than 100 MHz. The A/D converter can be implemented, for example, as an FPGA, an ASIC, or a general purpose processor programmed to convert analog data collected by the receiver 103 to a discrete signal. In some implementations, the A/D converter can be a delta-sigma A/D converter. In some implementations, the A/D converter can be configured to quantize sampled data at a relatively high resolution to avoid introducing significant quantization noise. For example, the A/D converter can represent each sampled signal value using 8 bits, 16 bits, or 32 bits.

Figure 1C:
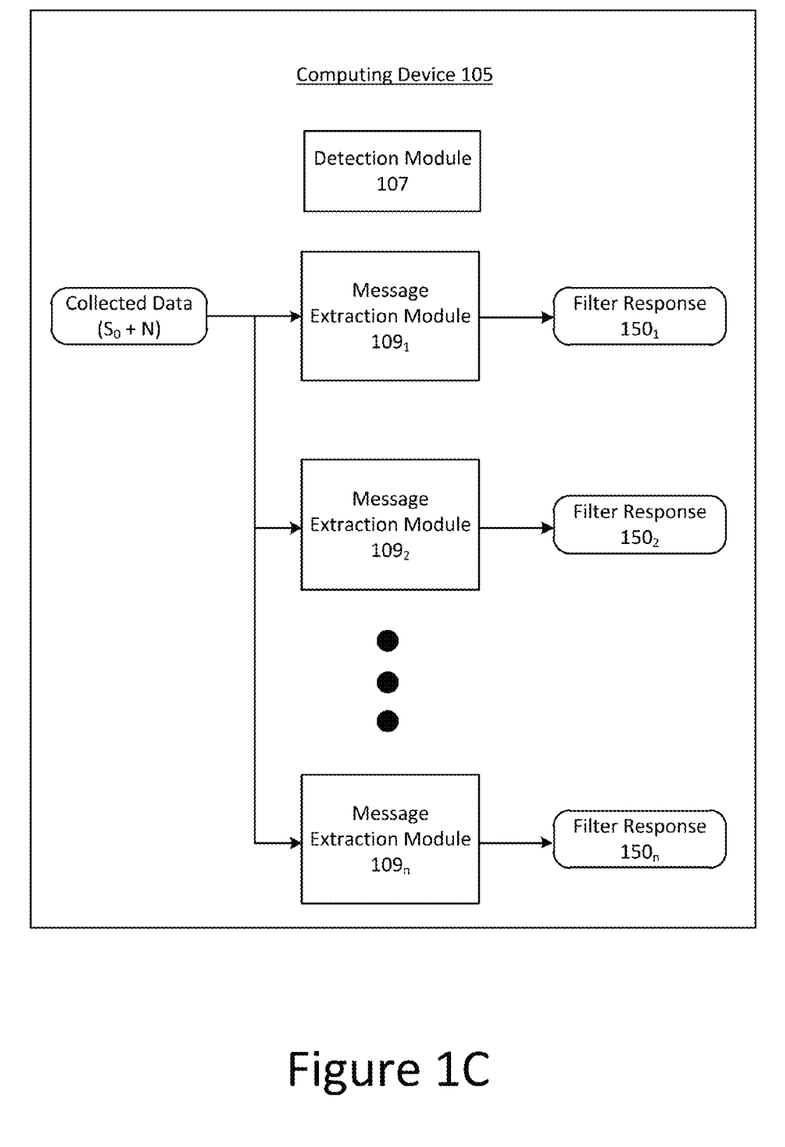
FIG. 1C is a block diagram of an alternative example of a the computing device shown in FIG. 1A, including a plurality of message extraction modules.

FIG. 1C is a block diagram of an alternative example of a the computing device 105 shown in FIG. 1A, including a plurality of message extraction modules $109_1$-$109_n$ (generally referred to as message extraction modules 109). Each of the message extraction modules 109 can include a multistage adaptive filter as shown in FIG. 1B, and can receive the collected data from the receiver 103. Likewise, each message extraction module 109 can generate a respective filter response $150_1$-$150_n$. In some implementations, the algorithm performed by each message extraction module 109 relies on information regarding the functional shape of the signal, and a given message extraction module 109 can therefore respond only to message signals having one functional shape. A signal having a particular functional shape represented by the function $S_0(n)$ can correspond to a particular message. For example, the shape of the function $S_0(n)$, representing the received message signal, can uniquely identify the transmitter 101 shown in FIG. 1A. In some implementations, the system 100 may include additional transmitters 101, each of which is configured to send a message signal having a unique functional shape. In such implementations, the computing device 105 can include multiple instances of the message extraction module 109 as shown in FIG. 1C, each of which may include a multistage adaptive filter configured to respond to a particular one of the message signals transmitted by the transmitters 101. By monitoring the filter responses of the various message extraction modules 109, the computing device 105 can determine which of the transmitters 101 is responsible for transmitting a particular message signal to the computing device 105, as well as the time at which each message signal is received.

As described further below in connection with FIG. 8, the algorithm implemented by the message extraction module 109 may rely on information relating to the time at which the message signal was received so that the postulated signal can be positioned at the correct arrival time. In some implementations, the message can be preceded by a preamble, and detection of the preamble can be used to determine the approximate arrival time of the message. Techniques for detecting a preamble are described further below in connection with FIGS. 2-7.

Figure 2:
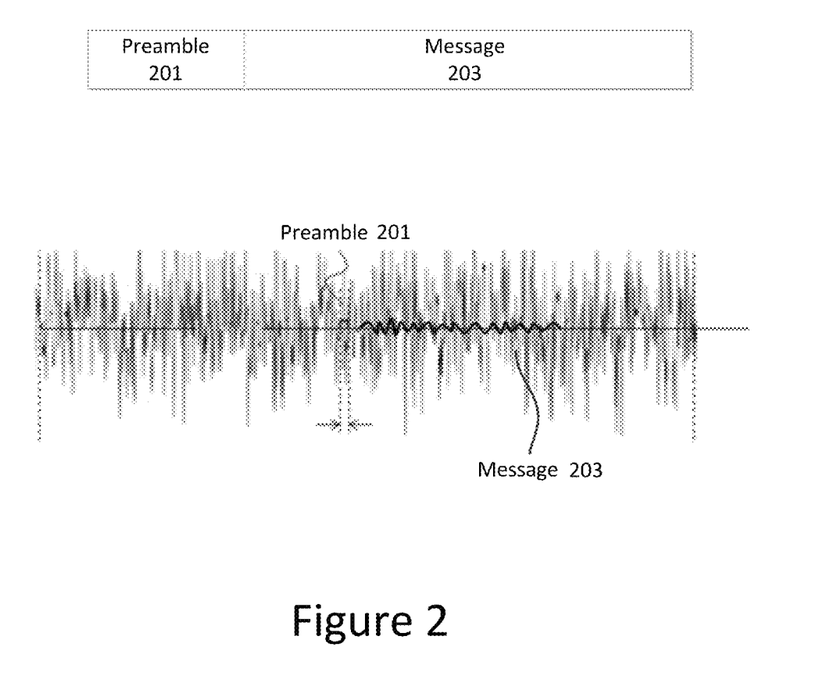
FIG. 2 is a diagram of a message including a preamble that can be detected by the system of FIG. 1A, according to an illustrative implementation.

FIG. 2 shows an example of data received by the receiver 103. The data includes noise, a preamble 201 and a message 203. The amplitude of the message and the preamble are below the amplitude of the received noise.

In some implementations, the preamble can be a short, low-amplitude signal with a known waveform arriving at an uncertain moment within a much larger sampling interval. The signal, including the preamble and the message, can be buried far below the total noise level, and can be broadcast very infrequently with short duration. In some implementations, the duration of the preamble can be less than about 5%, less than about 4%, less than about 3%, less than about 2%, or less than about 1% of the duration of the sampling interval. For example, in some implementations the preamble can be a half of a full square-wave cycle of duration $\Delta t_{sig}$=0.5 msec, occurring just once in a time interval of 60 seconds. In some implementations, the duration of the preamble may be longer or shorter. For example, the preamble may be about 0.1 seconds, about 0.25 seconds, about 0.75 seconds, about 1 second, or about 2 seconds in duration. In still other implementations, the sampling interval can be significantly shorter. For example, the sampling interval can be about 30 milliseconds, about 40 milliseconds, about 50 milliseconds, about 60 milliseconds, or about 70 milliseconds, and the duration of the preamble can be between about 1% and about 5% of the duration of the sampling interval. The background root mean square (RMS) noise amplitude (i.e. full bandwidth noise) can be significantly larger than the RMS amplitude of the signal. For example, the RMS amplitude of the noise may be about 50 times larger, about 60 times larger, about 70 times larger, about 80 times larger, about 90 times larger, or about 100 times larger than the RMS amplitude of the signal. In some implementations, the RMS amplitude of the noise may be more than 100 times larger than the RMS amplitude of the signal.

When data is collected by the receiver 103 over a relatively large interval, such as 60 seconds, at very high rate around the time a signal including a preamble is expected, this data must be rapidly analyzed for presence of a signal. In some implementations, signal detection must be established with high probability, and the signal arrival time must be determined with high accuracy. The large duration of the sampling interval relative to the duration of the preamble, as well as the relatively low signal-to-noise ratio, can make it difficult to detect the preamble (e.g., half of a square-wave cycle, of duration 0.5 msec).

Figure 3:
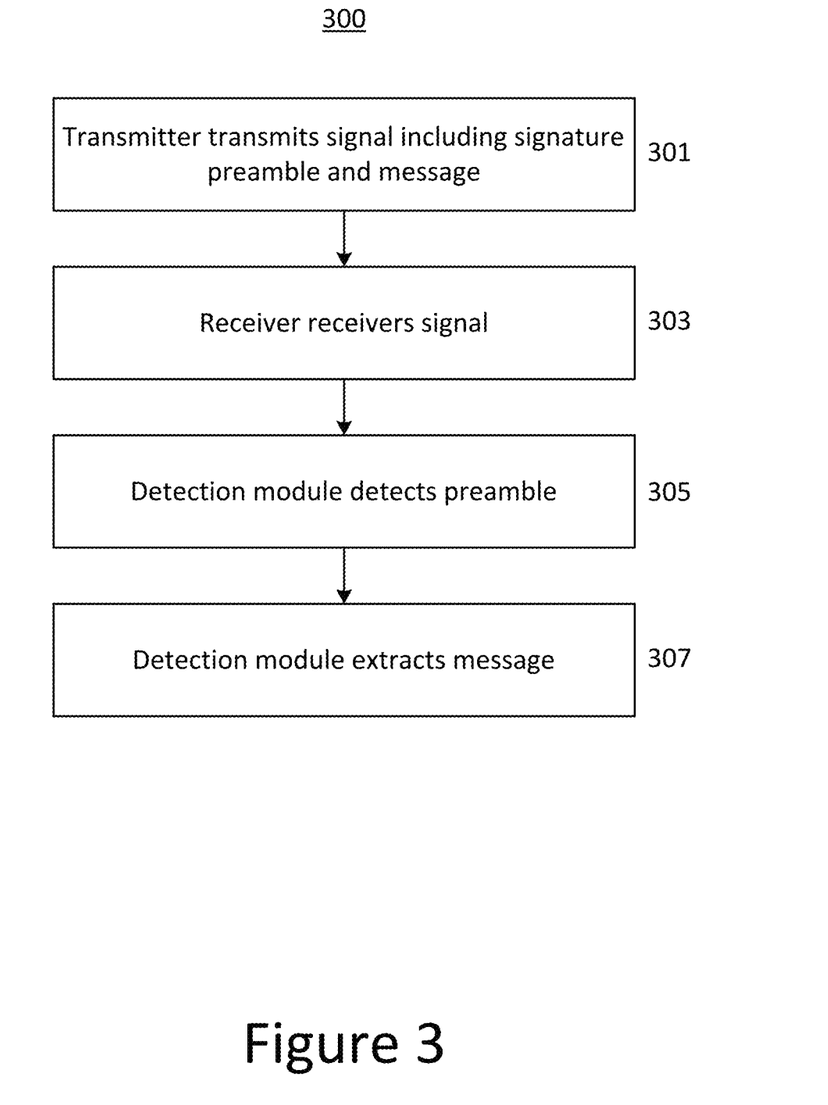
FIG. 3 is a flow diagram of an example method performed by a system for detecting signals, according to an illustrative implementation.

FIG. 3 depicts a method 300 carried out by the example system 100 shown in FIG. 1A. The method 300 begins with the transmitter 101 transmitting a signal that includes a signature preamble and a message (step 301). The receiver 103 receives the signal (step 303). The detection module 107 detects the preamble in the data received by the receiver 103 (step 305) and extracts the message from the received signal (step 307).

As indicated above, the transmitter 101 can transmit a signal (step 301) in any electromagnetic frequency band. In some implementations, the transmitter 101 transmits a signal, including a preamble and a message, in the VLF region of the radio frequency band. In some other implementations, the transmitter can transmit another kind of signal, such as an acoustic signal.

The receiver 103 receives the signal (step 303). In addition to receiving the signal, the receiver also receives noise. As described above, the message and preamble can have lower amplitudes than the noise received. Collectively, any received signals, noise, or a combination thereof that are received by the receiver are referred to herein as "collected data."

The detection module 107 detects the preamble within the collected data (step 305). The method employed by the detection module 107 to locate the preamble within the collected data is discussed in greater detail below and in reference to FIGS. 4 and 5. The detection module 107 extracts the message from the collected data using the preamble as a landmark. In some other implementations, the message extraction module 109 can instead be used to extract the message from the collected data.

Figure 4:
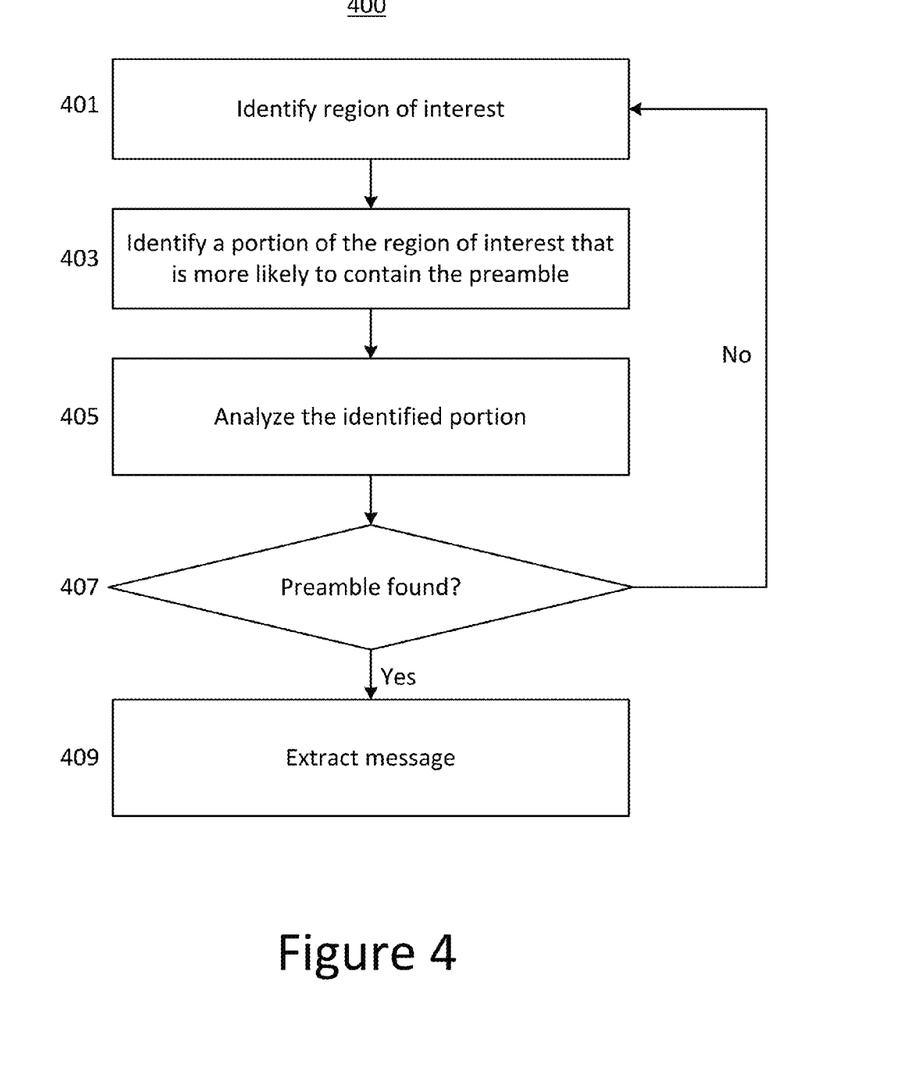
FIG. 4 is a flow diagram of an example method performed by a detection module of a system for detecting signals, according to an illustrative implementation.

FIG. 4 is a flow chart depicting a method 400 performed by the detection module 107 to locate a preamble within data collected by the receiver 103. The method 400 begins with the detection module 107 identifying a region of interest in the collected data (step 401). The detection module 107 then identifies a portion of the region of interest that is more likely to contain the preamble (step 403). The detection module 107 analyzes the identified portion of the region of interest (step 405). If the preamble is found within the region of interest (decision box 407), the detection module 107 extracts the message (step 409). If the preamble is not found in the region of interest, the detection module 107 repeats step 401 to identify a new region of interest.

The detection module 107 can select a region of interest (step 401) of any length. For example, the region of interest can be about one second, five seconds, ten seconds, sixty seconds or longer in length. In some other implementations, the region of interest can be about one millisecond, five milliseconds, ten milliseconds, or sixty milliseconds in length. In some implementations, the region of interest is selected based on an expected time of reception. The expected time of reception can be selected by a user or can be determined by the detection module 107, for example based on other data provided by a user.

Figure 5:
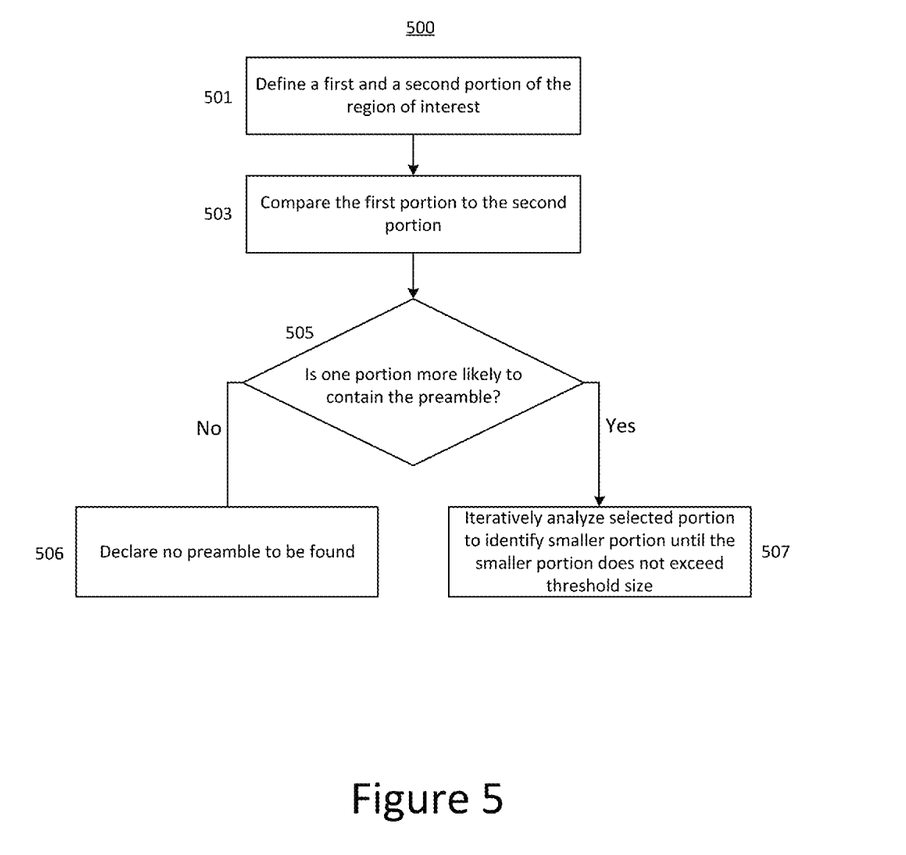
FIG. 5 is a flow diagram of an example method performed by a detection module of a system for detecting signals, according to an illustrative implementation.

Next, the method 400 includes identifies a portion of the region of interest that is more likely to contain the preamble (step 403). FIG. 5 is a flow chart depicting one suitable example method 500 performed by the detection module 107 for carrying out this step. The method 500 begins with the detection module 107 defining a first portion and a second portion of the region of interest (step 501). The detection module 107 compares the first and second portions of the region of interest (step 503) to determine if one portion is more likely to contain the preamble (step 505). If one portion is not determined to be more likely to contain the preamble, the detection module 107 can determine that the preamble is not located in the region of interest (step 506). If one portion of the region of interest is more likely to contain the preamble, the detection module 107 iteratively analyzes the selected portion to identify a smaller portion that is more likely to contain the preamble, until the identified smaller portion does not exceed a minimum size (step 507).

The detection module 107 defines a first and second portion of the region of interest (step 501). In some implementations, the first and second portions of the region of interest of the collected data are equally sized portions of the region of interest that include half of the collected data within the region of interest. For example, if the region of interest is 60 seconds long, the first and second portions of the region of interest can each be 30 seconds long and can contain no overlap.

The detection module 107 compares the first and second portions of the region of interest (step 503) to determine if one portion is more likely to contain the preamble (step 505). The detection module 107 can use one of a number of mathematical operations to compare the first and second portions. In some implementations, a convolution technique, described below and in reference to Eqns. 1a and 1b, can be used.

For example, if the noise pictured in FIG. 2 is stationary, in the global sense, over a 60 second interval from $t_s$ to $t_f$, the comparison of a first and second portion of the region of interest (step 503) could be conducted by comparing the results of the following convolutions:

$$R(\text{left}) = \sum_{t_s=0}^{t_m=30 \ sec} r(t) * S_N(\tau - t) \quad (1a)$$

$$R(\text{right}) = \sum_{t_m=30 \ sec}^{t_f=60 \ sec} r(t) * S_N(\tau - t) \quad (1b)$$

In Eqns. 1a and 1b above, r(t) is the signal amplitude at the receiver, consisting of noise and signal at some point during the 60 second interval, i.e., r(t)=N(t)+S(t) where N(t) is a randomly distributed function of t representing the noise, with a mean of zero and a standard deviation of $\sigma_o$. The function $S_N(t)$ is the normalized known signal (one half cycle of a square wave function with unity amplitude, in this example), and the quantity $S_N(\tau-t)$ represents the time reversed signal, where $\tau$ is the convolution variable. The functions R(left) and R(right) are the convolutions with the known, normalized signal of the first 30 seconds and final 30 seconds of the receiver output, respectively. They represent the matched filter response to the first 30 seconds or second 30 seconds of the receiver output.

For purposes of this example, it is assumed that the preamble exists somewhere within either the first or second 30 second summations of Eqns. 1a and 1b. In practice, this assumption is likely to hold because, given that each of the first and second 30 second summations of Eqns. 1a and 1b is significantly longer than the duration of the preamble, it is unlikely that the preamble will occur at the dividing time between the first and second 30 second summations. It is possible to define the condition under which the interval containing the signal could be identified with a high probability by comparing the magnitude of R(left) and R(right). Specifically, the measured difference between R(right) and R(left) will, with high probability, indicate the presence of a signal within the right or left time interval if:

$$k\sigma_{sum}(t_s - t_m \to t_s) = k\left\langle \sum_{t=t_s-t_m}^{t=t_s} N(t) * S_N(\tau - t) \right\rangle_{std} \leq |R(\text{right}) - R(\text{left})| \quad (2)$$

In Eqn. 2, k is a positive real number of 1 or greater, equal to the signal-to-noise ratio of the matched filter response difference (i.e., the value of k determines the probability that the left-right difference indicates a signal is present), $k\sigma_{sum}$ $(t_s-t_m \to t_s)$ is k times the standard deviation of the convolution of noise only over a time interval from $t_s-t_m$ to $t_s$, and $S_N(t)$ is the normalized signal only. In the example above, $t_s$ and $t_m$ would be 0 and 30 seconds, respectively, and the convolution on the noise only, shown in the summation of Eqn. 2, would be done from −30 seconds to 0 seconds (i.e., just before the 60 second time interval of interest). If the distribution of N(t) is stationary in the global sense, and the condition of Eqn. 2 is met, then there is a high probability that the signal occurred in the first 30 seconds if R(right)>R(left). Similarly, there is a high probability that the signal occurred in the last 30 seconds if R(right)<R(left).

Assuming the signal appeared in the earlier half of the interval for the purpose of this example, the absolute value of the difference shown in Eqn. 2 can be written as follows:

$$|R(\text{right}) - R(\text{left})| = \quad (3)$$

$$\left| \sum_{t=30\,seconds}^{t=60\,seconds} NS_N(\tau - t) - \sum_{t=0}^{t=30\,seconds} (AS_N + N)S_N(\tau - t) \right| \approx$$

$$\left| -A \sum_{t=0}^{t=30\,seconds} S_N S_N(\tau - t) \right| = An_{signal}$$

In Eqn. 3, $n_{signal}$ is the number of samples recorded of the signal, and A is the amplitude of the signal, measured at the receiver. The left-hand-side expression for $k\sigma_{sum}(\tau)$ in Eqn. 2 can be written as $$k\left\langle \sum_{t=t_s}^{t=t_f} N(t) * S_N(\tau - t) \right\rangle_{std} = k\langle N(t) * S_N(\tau - t)\rangle_{std} \sqrt{T_{sample} \Delta t_{sample}} \quad (3a)$$

Since the normalized signal, $S_N$, is either one or zero in our example (square wave), Eqn. 3a can be reduced to $$k\left\langle \sum_{t=t_s}^{t=t_f} N(t) * S_N(\tau - t) \right\rangle_{std} = k\langle N(t)|_{t_1}^{t_0}\rangle_{std} \sqrt{T_{interval} \Delta t_{sample}} \quad (3b)$$

In Eqn. 3a and 3b, $T_{interval}=t_f-t_s$, and $\Delta t_{sample}$ is the time interval between (digitally recorded) samples. The standard deviation of N(t) evaluated over the time interval where the signal is present (from $t=t_1$ to $t=t_0$) can be represented by $\sigma(n_{signal})$ where $n_{signal}$, as before, is the number of samples recorded in the interval from $t_1$ to $t_0$. If the distribution of N(t) is stationary in the global sense, then $\sigma(n_{signal}) \to \sigma_o$ for large values of $n_{signal}$. This disclosure is primarily concerned with very short duration signals, and therefore retains the label $\sigma(n_{signal})$ to distinguish it from $\sigma_o$. In real noise data, the value of $\sigma(n_{signal})$ may never be asymptotic to a single value (i.e., it is not globally stationary). Putting Eqn. 3b together with the condition where the inequality in Eqn. 2 is just being met (i.e., where the inequality is replaced by an "=" sign), Eqn. 2 can be written as $$n_{interval} = \left( \frac{An_{signal}}{k\sigma(n_{signal})\Delta t_{sample}} \right)^2 \quad (4)$$

Figure 6:
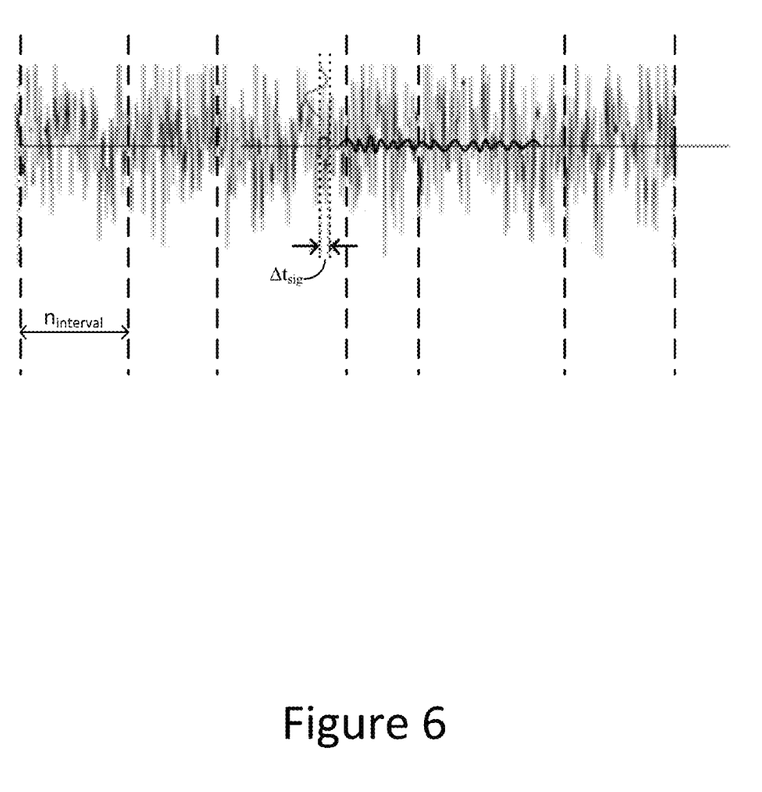
FIG. 6 is a diagram of a message including a preamble that can be detected by the system of FIG. 7, according to an illustrative implementation.

Eqn. 4 is part of the basis for the preamble detection technique described in this disclosure. The parameters A, $n_{signal}$, and $\Delta t_{sample}$ (=1/sampling frequency) are known, and noise-only data just prior to the time interval from $t_s$ to $t_f$ can be used to compute $\sigma(n_{signal})$. Therefore, the value $n_{interval}$ computed from Eqn. 4 is the largest statistically valid time search interval that can be used to identify the presence of a preamble with a given confidence when comparing two different intervals. Although the specifics depend on the nature of the measured noise, N(t), individual search intervals can be of much longer duration than the preamble. An illustration of $n_{interval}$ and $\Delta t_{signal}$ is shown in FIG. 6 below. In this diagram, $n_{interval}$ adaptively changes size, depending on the characteristics of the noise preceding or surrounding the interval. This feature is discussed further below. As FIG. 6 suggests, each time interval defined by $n_{interval}$ can be examined with a single matched filter convolution. The interval containing the signal will create a matched filter response that is $k\sigma(n_{signal})$ larger in magnitude than the response to noise only. The search interval, $n_{interval}$, is shown in relation to the signal duration.

If it is determined that one of the first and second portions is more likely to contain the preamble, the method 500 includes iteratively analyzing the selected portion to identify smaller portions that are more likely to contain the preamble, until the identified smaller portion does not exceed a threshold size (step 507). In some implementations, this iterative process can be implemented as an adaptive feedback loop, with the statistically correct interval size determined by the parameters on the right hand side of Eqn. 4 for each interval. The mechanism underlying one example adaptive feedback loop is shown in FIG. 7.

Figure 7:
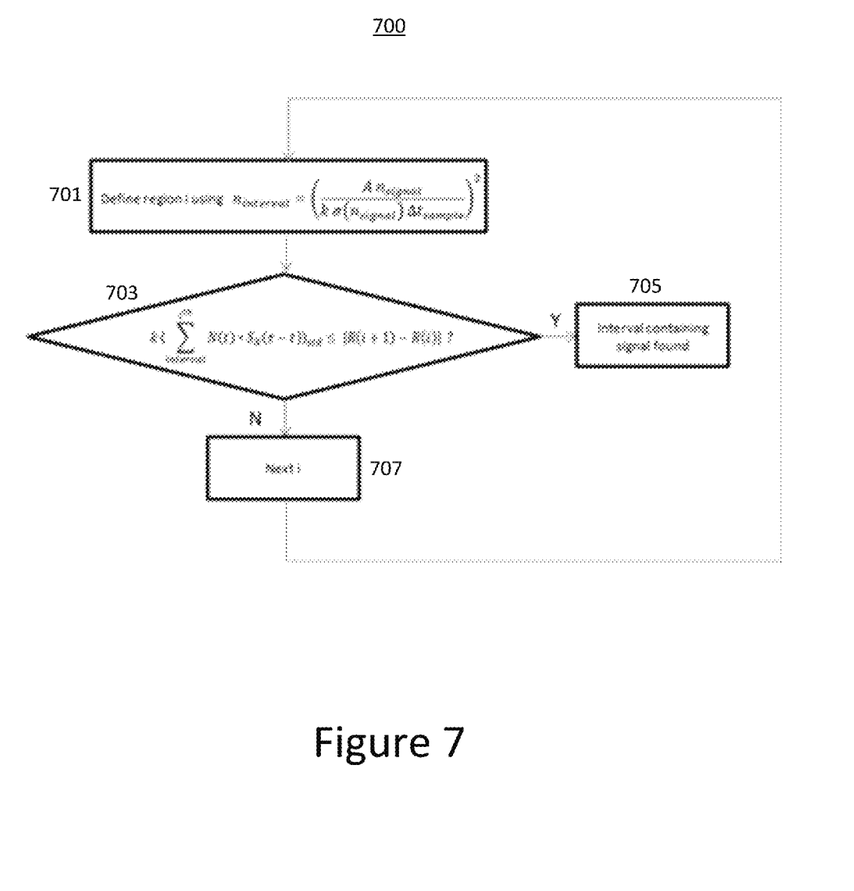
FIG. 7 is a flow diagram of an example method performed by a detection module of a system for detecting signals, according to an illustrative implementation.

FIG. 7 is a flow chart depicting a method 700 performed by the detection module 107, employing an adaptive feedback loop. A region, including a plurality of intervals, is defined within the collected data (step 701). The region is analyzed to determine if Eqn. 2 is satisfied (step 703). If it is, the interval containing the preamble signal is determined to be found by the detection module 107 (step 705). If Eqn. 2 is not satisfied, another region is defined by repeating step 701.

Referring to FIG. 7, a collection of $n_{signal}$ samples of receiver output known not to contain the signal of interest are used to find the value of $\sigma(n_{signal})$. This is the initial interval, (i.e., the interval designated by the interval number i=0). In an alternative implementation, preferred for some types of background noise, the maximum value of $\sigma(n_{signal})$ is calculated from multiple independent intervals of the receiver output where the preamble is known not to be present. For example, this alternative implementation could be useful when the background noise is known to be non-stationary over time intervals longer than the largest time interval available to be analyzed. The value of k is chosen, and values of A (amplitude of the preamble signal-of-interest at the receiver), and $\Delta t_{sample}$ (=1/sampling frequency) are known. Eqn. 4 determines $n_{interval}$, the maximum number of samples of receiver output to be analyzed in the i=1 interval of receiver output that might contain the preamble. The analysis of whether the preamble is present is performed by determining whether the difference between R(left) and R(right) (as described by Eqns. 1a and 1b) meet the criteria given in Eqn. 2 (step 703). If the criteria is not met ("N" in flow chart of FIG. 2), the next interval (i=2) is examined. In some implementations, the result from the most recently analyzed interval (i=1 in this example) is then used to re-compute $\sigma(n_{signal})$, and $n_{interval}$ is recalculated. The rationale for using the most recently analyzed interval to recalculate $\sigma(n_{signal})$ comes from the knowledge that real background noise is often not precisely stationary, and gradual changes in the distribution and amplitude of background noise may occur. To compensate for this drift, the i=1 interval gives the most recent "update" on the background noise trend. The loop in FIG. 7 is continued until either the signal is detected in some interval or until every interval is checked and no detection meets the statistical criteria. Since $n_{interval} \gg n_{signal}$ for many types of noise, the loop executes very rapidly on a large amount of data, quickly finding an interval containing the signal of interest, if it is there.

In yet another implementation, the reference interval can be chosen to be a combination of data points from two or more preceding intervals. The rate of change of $\sigma(n_{signal})$ between the two or more intervals (i.e., $d\sigma(n_{signal})/dx$ or higher order derivative) can give a more accurate prediction of the background noise during the time the signal may have occurred. This approach more accurately captures trends in background noise, and can be used to reduce false negatives or false positives in highly variable background noise. In yet another implementation, the feedback loop shown in FIG. 7 can include the automatic adjustment of the parameter "k", which determines the probability that a detected signal is the actual signal. If the entire receiver output interval to be analyzed results in no detection at the initial value chosen for k (i.e. $k_o$) the same data can be processed (without significant further computation) at a lower value of k (i.e. $k_o - \Delta k$) until at least one detection occurs. The probability that this detection is the actual signal is decreased, but may remain high enough to be considered a likely detection. Likewise, if multiple instances of signal are detected within the receiver output at the initial value of k, the required change in the value of k (i.e. $k_o + \Delta k$) can be determined without significant further computation, and such that only one instance of signal detection remains. This identified signal will have an increased probability that it is the actual signal, and false positives will be eliminated.

Once a portion of the region of interest is identified as the portion more likely to contain the preamble, the preamble can be extracted from the collected data using, for example, any of the techniques described above. After the preamble has been identified, the message can be extracted from the collected data. Techniques for extracting the message from the collected data are described further below in connection with FIG. 8.

Figure 8:
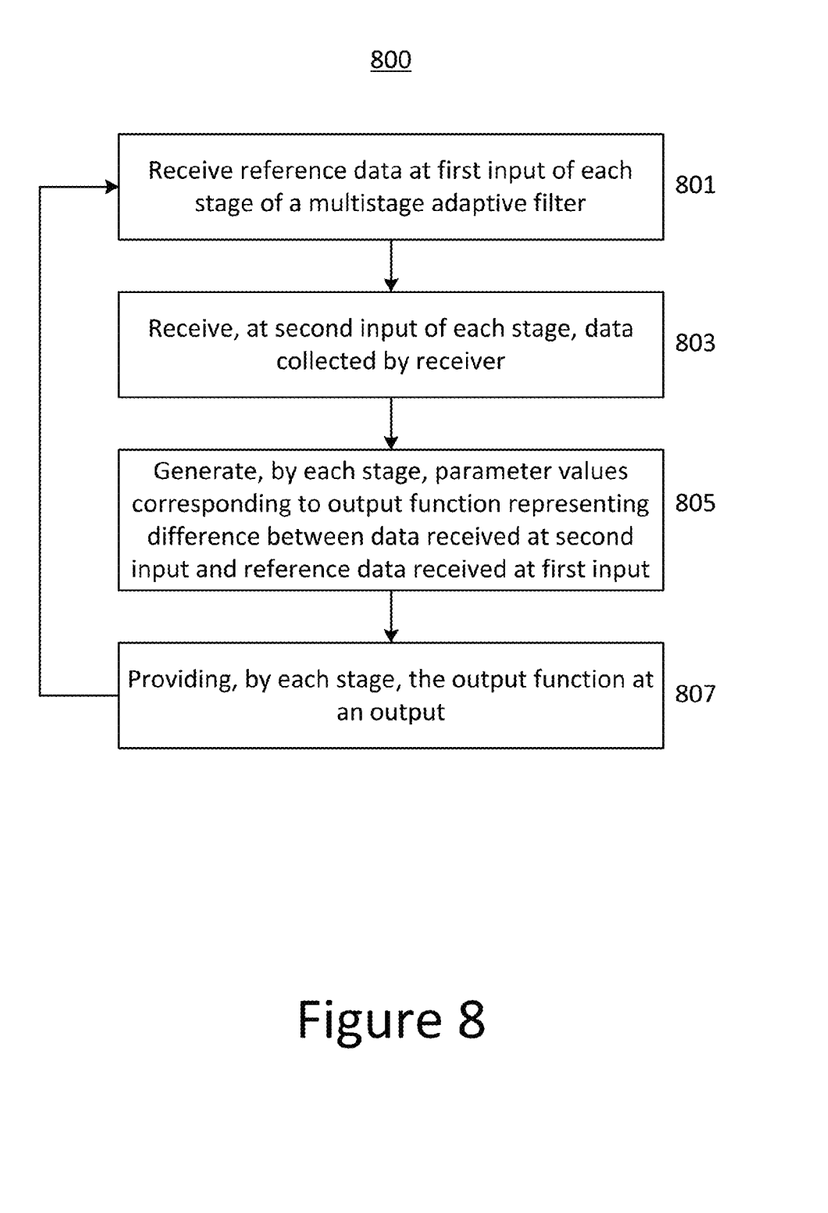
FIG. 8 is a flow diagram of an example method for extracting a message from a received signal.

FIG. 8 is a flow diagram of an example method 800 for extracting a message from collected data. In brief overview, the method 800 includes receiving reference data at each stage of a multistage adaptive filter (step 801). The method 800 includes receiving, at a second input of each stage, data collected by a receiver (step 803). The data collected by the receiver can include a message that can be represented by a discrete function defined by a set of parameters. The method 800 includes generating, by each stage, a value for each parameter corresponding to an output function representing a difference between the data received at the second input of each stage and the reference data received at the first input of each stage (step 805). The method 800 includes providing, by each stage, the output function at an output (step 807). In some implementations, the steps of the method 800 can be performed by the message extraction module 109 shown in FIGS. 1A and 1B.

Referring now to FIGS. 1A, 1B, and 8, the method 800 includes receiving reference data at each stage of a multistage adaptive filter (step 801). It is assumed that the functional shape of the message signal is known and can be parameterized according to the following equation:

$$S_0(n) = f(n, a, b, c, \dots) \quad (5)$$

In Eqn. 5, the parameters a, b, c . . . completely describe the shape of the signal. The noise function N(n) can have an arbitrary distribution, which does not have to be stationary over the duration of the signal. The signal postulation module 140 provides the reference data to the reference input 134a of the first adaptive filter 130a. In some implementations, the reference data provided by the signal postulation module 140 represents an approximation of the signal $S_0(n)$. Thus, while this input is labeled $S_1$ in FIG. 1B, it should be understood that this input can change over time and can be represented as $S_n$ for the nth iteration. The reference data received at the reference input 134b of the second adaptive filter 130b is the output of the first adaptive filter 130a.

The method 800 includes receiving, at a second input of each stage of the multistage adaptive filter, data collected by a receiver (step 803). The collected data can be a digital representation of the data received by the receiver 103, which includes a signal component $S_0(n)$ and a noise component N(n). In some implementations, the signal component of the collected data can represent a message transmitted by the transmitter 101.

The method 800 includes generating, by each stage, a value for each parameter corresponding to an output function representing a difference between the data received at the second input of each stage and the reference data received at the first input of each stage (step 805). The adaptive filters 130 can be configured to analyze the reference input and generate time-varying finite-impulse-response filter coefficients (i.e., values for the parameters a, b, c, . . . ) to remove the data received at their respective reference inputs 134 from the data received at their collected data inputs 132. Thus, the first adaptive filter 130a generates an output function represented by the following equation:

$$E_1(n) = S_0(n) + N'(n) - k_s S_1(n) \approx N(n) + C_0 \quad (6)$$

In Eqn. 6, the function N'(n) is the noise function modified by the change in the adaptive filter coefficients responding to the transient presence of the signal represented by the collected data. $k_s$ is a multiplier applied at the reference input 134a. If the signal were of sufficiently long duration, the first adaptive filter 130a could generate an unstable response due to numerical error. However, because the signal appears for only a relatively short duration of time, $N'(n) \approx N(n)$ during the signal period. When the term $k_s S_1(n)$ is arbitrarily close to the signal waveform, as is to be expected given that the general shape of the signal is known, $C_0$ is approximately a constant over the duration of the signal. If the signal were known exactly such that the data received at the reference input 134a were identical to the signal component of the collected data received at the input 132a, Eqn. 6 implies that the output of the first adaptive filter 130a would represent just the noise component of the collected data after the first adaptive filter 130a converges. This estimated noise component becomes the reference data input 134b of the second adaptive filter 130b, which also receives the collected data at the input 132b.

The adaptive filter 130b also analyzes the data received at its reference input 134b and generates time-varying finite-impulse-response filter coefficients to remove the data received at the reference input 134b from the collected data received at the input 132b to generate an output signal E2. Thus, the second adaptive filter 130b generates an output represented by the following equation:

$$E_2(n)=S_0(n)-C_0 \approx S_0(n) \quad (7)$$

Eqn. 7 implies that the DC offset $C_0$ is removed, and the resulting output signal is an approximation of the signal component $S_0$ of the collected data, which becomes the filter response 150.

The method 800 includes providing, by each stage, the output function at an output (step 807). As shown in FIG. 1B, the output function generated by the first adaptive filter 130a is provided at the output 136a, which is coupled to the reference inputs 134b of the second adaptive filter. The output function generated by the second adaptive filter 130b is provided at the output 136b. To improve the filter response 150, the steps of the method 800 can be repeated and the output of the second adaptive filter 130b can be provided back to the signal postulation module 140, to provide a better approximation of the message signal $S_0$ to be used as reference data by the first adaptive filter 130a. This process can be iterated any number of times until the outputs of each adaptive filter 130 converge, to improve the filter response 150.

The algorithm used by each adaptive filter 130 to generate values for the filter coefficients can be based on any type of multivariate optimization technique. In some implementations, the optimization technique used by the first adaptive filter 130a can be different from the optimization technique used by the second adaptive filter 130b. For example, in some implementations, one or both of the adaptive filters 130 can generate values for its respective filter coefficients using multivariate optimization techniques such as the simplex method, the least mean squares method, or the gradient method.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The terms "computer" or "processor" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

What is claimed is:

1. A method of detecting signals comprising:
   collecting, by a receiver, data comprising noise and a signal in the very low frequency range having an amplitude lower than that of the noise, the signal comprising a preamble and a message;
   defining a region of interest of the collected data;
   comparing convolutions of left and right sides of the region of interest;
   identifying a side of the region of interest that is more likely to contain the preamble, based on the comparison of the convolutions of the left and right sides of the region of interest;
   defining a plurality of portions within the side of the region of interest that is identified as more likely to contain the preamble; and
   iteratively comparing two halves of each of the plurality of portions of the region of interest to identify a portion of the region of interest that is more likely to contain the preamble.

2. The method of claim 1, wherein an amplitude of the noise is at least about 50 times larger than an amplitude of the signal.

3. The method of claim 1, wherein collecting the data comprises collecting the data during a collection interval, and wherein a duration of the preamble is less than about 2% of a duration of the collection interval.

4. The method of claim 1, wherein the preamble can be represented as at least a portion of a full square wave cycle.

5. The method of claim 1, further comprising determining an approximate time of arrival of the preamble.

6. The method of claim 1, further comprising extracting the message from the collected data using a multistage adaptive filter, wherein the message can be represented by a discrete function defined by a set of parameters.

7. The method of claim 6, wherein extracting the message from the collected data using a multistage adaptive filter further comprises:
    receiving, at a first input of each stage, reference data;
    receiving, at a second input of each stage, the data collected by the receiver;
    generating, by each stage, a value for each parameter of the set of parameters, the values of the parameters selected to correspond to an output function representing a difference between the data received at the second input and the reference data received at the first input; and
    providing, at an output of each stage, the output function.

8. The method of claim 7, wherein:
    the reference data received at the first input of a first stage of the multistage adaptive filter comprises a postulated signal input approximating the signal included within the data collected by the receiver; and
    the reference data received at the first input of a second stage of the multistage adaptive filter comprises the output function provided at the output of the first stage.

9. The method of claim 8, further comprising generating the postulated signal input based at least in part on the output function provided at the output of the second stage.

* * * * *